(12) United States Patent
Heske, III

(10) Patent No.: US 10,782,183 B2
(45) Date of Patent: Sep. 22, 2020

(54) ADAPTIVE FILTERING OF A LOAD CELL OF A POINT-OF-SALE (POS) DEVICE

(71) Applicant: NCR Corporation, Atlanta, GA (US)

(72) Inventor: Theodore Heske, III, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/204,105

(22) Filed: Nov. 29, 2018

(65) Prior Publication Data

US 2019/0094065 A1 Mar. 28, 2019

Related U.S. Application Data

(62) Division of application No. 14/278,796, filed on May 15, 2014, now Pat. No. 10,197,434.

(51) Int. Cl.
*G01G 23/01* (2006.01)
*G01G 19/414* (2006.01)
*G01G 23/10* (2006.01)

(52) U.S. Cl.
CPC ......... *G01G 23/01* (2013.01); *G01G 19/4144* (2013.01); *G01G 23/10* (2013.01)

(58) Field of Classification Search
CPC .............................. G01G 23/01; G01G 23/10
USPC ......................................................... 73/1.13
See application file for complete search history.

(56) References Cited

U.S. PATENT DOCUMENTS

| | | | | |
|---|---|---|---|---|
| 5,210,706 A | * | 5/1993 | Nishiyama | G01G 3/147 177/25.13 |
| 2003/0215100 A1 | * | 11/2003 | Kimura | G01G 3/147 381/71.1 |
| 2007/0095123 A1 | * | 5/2007 | Aikawa | G01G 23/10 73/1.35 |

* cited by examiner

*Primary Examiner* — Nathaniel T Woodward
(74) *Attorney, Agent, or Firm* — Schwegman, Lundberg & Woessner

(57) ABSTRACT

A Point-Of-Sale (POS) device detects vibrations produced from equipment in its operational environment. The vibrations are identified and one or more filters produced to remove the vibrations when the POS device is used to improve the accuracy of the POS device.

4 Claims, 4 Drawing Sheets

ADAPTIVE FILTERING OF A LOAD CELL OF A POINT-OF-SALE (POS) DEVICE

BACKGROUND

Point-Of-Sale (POS) devices often include a variety of integrated devices, such as scanners, scales, integrated scanners with scales, card readers with on-screen signature capabilities, and the like.

A scale (of integrated scanner with scale) in a typical installation often experiences mechanical vibrations coming from the operational environment. For example, at a check-station (type of POS device), product take-away belts and motorized turntables are both common and troublesome sources of mechanical vibrations. Mechanical vibrations affect the operation of a weigh scale, such that a measured weight fluctuates in value in response to the vibrations. These weight fluctuations can result in slow scale settling performance, no scale settling, scale underweight issues, and incorrect weight issues.

Mechanical vibrations encountered in the typical operational environment of a scanner/scale may be broadly characterized as have two different flavors: periodic; and, aperiodic. The most aperiodic vibrations happen as a result of customer and cashier activity during the check-out process. Placing an item on the weigh-plate and taking an item off of the weigh-plate are two significant sources of aperiodic vibrations. Aperiodic vibrations are both intermittent and unpredictable in the timing of their occurrence and can be properly viewed as a necessary part of the interaction between customer, cashier, and the POS equipment. Aperiodic vibrations also have the property that they decrease in intensity while the cashier and customer are waiting for the scale to determine the stable weight of an item just placed on the weigh-plate. As such, aperiodic vibrations associated with customer and cashier activity are not significant source of problems in weigh scale operation.

In contrast, the majority of periodic mechanical vibrations come primarily from mechanical conduction of motor vibrations from various sources within the environment. Example sources of periodic mechanical vibrations in a POS check-out station are the powered belts that move product to the cashier and then move product away from the cashier. Both motors and gear trains produce vibrational frequencies related to the rotation speed of their various components. Depending on the design of the check-out station, those vibrational frequencies can be felt by the scanner/scale and may even be amplified by the mechanical coupling between the installed weigh scale and the check-out station. While a scanner/scale cannot be expected to predict the kind of vibrational environment into which it may be installed, once it is installed, the vibrational environment takes on a much more predicable characteristic. When a scale is used in such an environment there is a need to have a scale that has some immunity to or makes some adjustments to account for vibrations encountered in its specific environment.

SUMMARY

In various embodiments, methods and a Point-Of-Sale (POS) device for adaptive environment adjustments are provided.

According to an embodiment, a method for adapted adjustment of a POS device is provided. Specifically, a frequency produced on a load cell is identified and the frequency is recognized as noise. Next, the load cell is dynamically adjusted to remove the frequency from signals produced by the load cell when the frequency is present.

DETAILED DESCRIPTION

Figure 1:
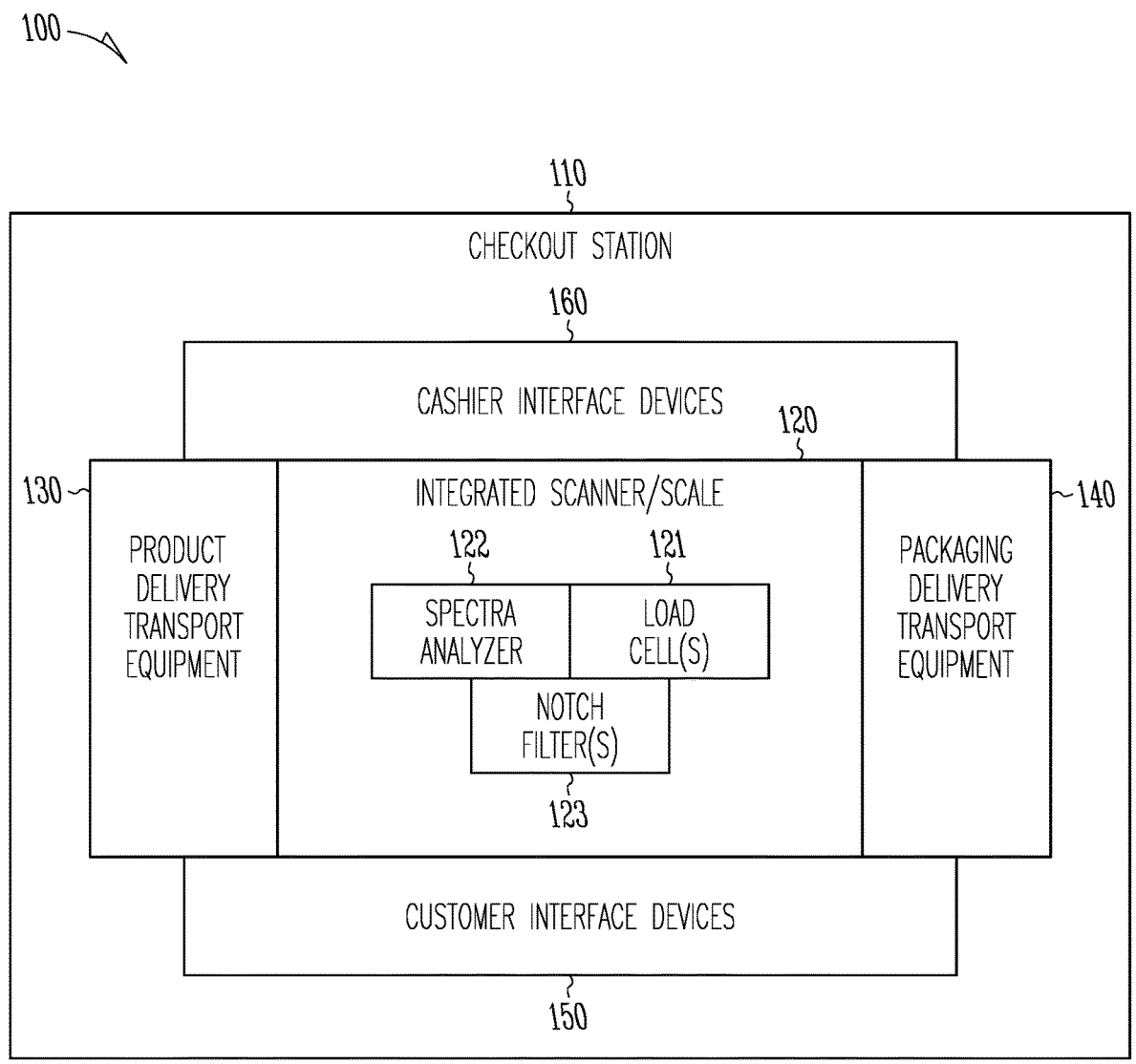
FIG. 1 is a diagram illustrating components of a Point-Of-Sale (POS) environment with a POS device that adapts its settings based on its environment, according to an example embodiment.

FIG. 1 is a diagram 100 illustrating components of a Point-Of-Sale (POS) environment with a POS device that adapts its settings based on its environment, according to an example embodiment. It is to be noted that the POS environment 110 is shown schematically in greatly simplified form, with only those components relevant to understanding of this embodiment being illustrated. The same situation may be true for the other various components of the POS environment 110.

Furthermore, the various components (that are identified in the FIG. 1) are illustrated and the arrangement of the components is presented for purposes of illustration only. It is to be noted that other arrangements with more or less components are possible without departing from the teachings of an adaptive POS device, presented herein and below.

Furthermore, the methods and adapted POS device presented herein and below (for self-environmental adjustment by a POS device) may include all or some combination of the components shown with the diagram 100. The methods are programmed as executable instructions in memory and/or non-transitory computer-readable storage media and executed on one or more processors associated with the components/devices.

Specifically, the diagram 100 permits an integrated scanner/scale 120 to adaptively filter out mechanical vibrations to provide more accurate weight readings, where the mechanical vibrations occur within the POS environment 110 as a result of one or more other devices operating within the POS environment. The details of this approach in view of the components, within the diagram 100, are now presented with reference to an embodiment of the FIG. 1 within the context of a POS checkout station.

However, before discussion of the diagram 100 is presented, it is to be noted that the methods and adaptive POS device presented herein are not limited to POS checkout station installations; that is, any POS environment or system (Self-Service Terminal (SST), kiosk, vending machine, check-in and/or check-out terminal, such as those used in retail, hotel, car rental, healthcare, or financial industries, etc.) can benefit from the teachings presented herein.

The diagram 100 includes a POS checkout station 110 (POS environment 110). The POS checkout station 110 includes an integrated scanner/scale 120, product delivery transport equipment 130, packaging delivery transport equipment 140, customer interface devices 150, and cashier interface devices 160.

In an embodiment, the POS checkout station 110 is a Self Service checkout station operated by a customer, such that it may not have the cashier interfaces devices 160, the product delivery transport equipment 130 may be a bay area to house products that are to be scanned, and the packaging delivery transport equipment 140 may be a baggage carousel, which may have a second scale having the components of the integrated scanner/scale 120 identified in the diagram 100.

The product delivery transport equipment 130 and the packaging delivery transport equipment 140 includes motors, gears, and conveyor belts for moving products in an automated fashion through the checkout station. The motors, gears, and belts generate vibrations which are detectable by the load cells 121 in contact with a weigh plate (not shown in the FIG. 1) of the integrated scanner/scale 120.

Similarly, the customer interface devices 150 (card reader, signature display, keypad, etc.) and the cashier interface devices 160 (keypad, cash drawer, scanning wand, monitor (can be touchscreen), etc.) can vibrate. Moreover, since all the components of the checkout station 110 are connected through mechanical equipment and/or electrical equipment, the weigh plate can experience those vibrations, which are detectable by the load cells 121.

The load cells 121 functionally act as a sensor or transducer and as weight is experienced on the weigh plate (the weigh plate itself has weight that exerts continuous force on the load cells), the forces on the load cells 121 are converted into electrical signals, such as voltage change, current change, frequency change, etc. The variations in the signals can be captured and monitored. Moreover, the vibrations from the various other components of the checkout station 110 are experienced by the weigh plate and thus detectable by the load cells 121 as changes in signals.

Each load cell 121 produces an electrical signal that is proportional to the instantaneous weight that it experiences from the weigh plate. However, when a load cell 121 is coupled to a vibrating weight (the weigh plate experiencing vibrations from the equipment), the instantaneous weight that the load cell 121 experiences will fluctuate. These fluctuations in sensed weight carry useful information about both the frequency of the vibrations and the intensity of the vibrations. In this manner the integrated scanner/scale 120 is able to sense, in significant detail, the vibrations of operational environment of the checkout station 110.

A spectra analyzer 122 (within the integrated scanner/scale 120) periodically performs a spectral analysis of its sensed vibrations occurring on the load cells 121 by using a Discrete Fourier Transform (DFT), a Fast Fourier Transform (FFT), or equivalent transforms. The spectral analysis provides data characterizing the vibrational environment of the checkout station 110, with key aspects being both frequency and magnitude of peaks in the vibrational spectrum. A constant frequency source of vibration shows up in a spectral analysis as a narrow peak with a high magnitude. The frequency of each peak in the spectral analysis that is of sufficient magnitude can be used as a basis for processing a notch filter 123 to subtract a particular vibration from a load cell signal. The notch filter 123 has the following characteristics: a notch center frequency that closely matches the measured spectral frequency of the vibrational peak; a notch width wide enough in frequency to span a substantial portion of the frequency spectrum corresponding to the vibrational peak; a magnitude response at the notch center frequency that is inversely proportional to the corresponding vibrational peak magnitude; and, a magnitude response outside of the notch width that is essentially 1.00000. Multiple notch filters 123 may be computed and used to filter the load cell signal thereby allowing the integrated scanner/scale 120 to actively (adaptively) cancel the effects of multiple vibrational sources. A load cell signal conditioned in this way is now much more stable in the presence of periodic vibrations.

This techniques works equally well in a scale 120 having multiple load cells 121. Each load cell 121, because of mechanical design and installation factors, may experience a vibrational spectrum that is unique when compared to other load cells 121 present in the same installation. A spectral analysis may periodically be performed by the scanner/scale 120 by the scanner/scale processing system using the signals produced by each load cell 121. In another embodiment, the load cell 121 may be an intelligent load cell 121 that includes a processing system suitable for computing the required spectra.

In an embodiment, the integrated scanner/scale 120 using the spectra analyzer 122 intelligently determines the times at which a spectral analysis may be performed. Since the goal is to characterize the sources of periodic vibrations, it is useful to avoid computing those spectra when either customers or cashiers are presently interacting with the POS equipment. For this purpose, human activity at the POS equipment may be inferred by monitoring weigh plate activity on the integrated scanner/scale 120 and other observables at the POS checkout station 110. For example, if the weigh scale identifies a non-zero, stable weight, it is a reliable indication that the POS checkout station 110 is in use and is therefore not the best time to compute a vibrational spectrum. When a bar code scanner is present, the reading of a bar code is another reliable indication that the POS checkout station 110 is in use and is therefore not the best time to compute a vibrational spectrum. Other indicators of the POS checkout station 110 being in-use may be derived from the POS checkout station 110. When the POS checkout station 110 is determined to not be in-use, vibrational spectra may be measured and computed with greater confidence that aperiodic vibrational sources are at a minimum, at least as far as human interaction with the POS checkout station 110 is concerned. Once the spectra are available, zero or more notch filters 123 may be computed and applied to one or more load cell signals.

Once the one or more load cell signals, have been filtered in the previously described manner, the weigh plate of the integrated scanner/scale 120 may then be reliably used to compute a weight of a produce being purchased at the POS checkout station 110. The weight thus computed will be substantially free from the effects of periodic vibrations, resulting in a more accurate price for a product being charged to the consumer.

It is noted that the integrated scanner/scale 120 can be a weigh scale only and does not have to be an integrated device and still adapted filter vibrations from the checkout station 110 environment to provide accurate product weights using the spectra analyzer 122, notch filters 123, and one or more load cells in the manner discussed above.

Conventionally, a common scale approach is it to apply heavy filtering in situations in which heavy vibrations may be encountered. Such approach has the drawback of slowing the response time of the weighing operations, regardless of the actual vibrational environment encountered by the equipment.

The scale adaptive approaches, discussed herein, have the advantage of self-adapting to the specific environment in which the scale 120 is operating, thereby producing benefits of faster settling time, improved weight stability, and improved weighing accuracy.

These and other embodiments are now discussed with reference to the FIGS. 2-4.

Figure 2:
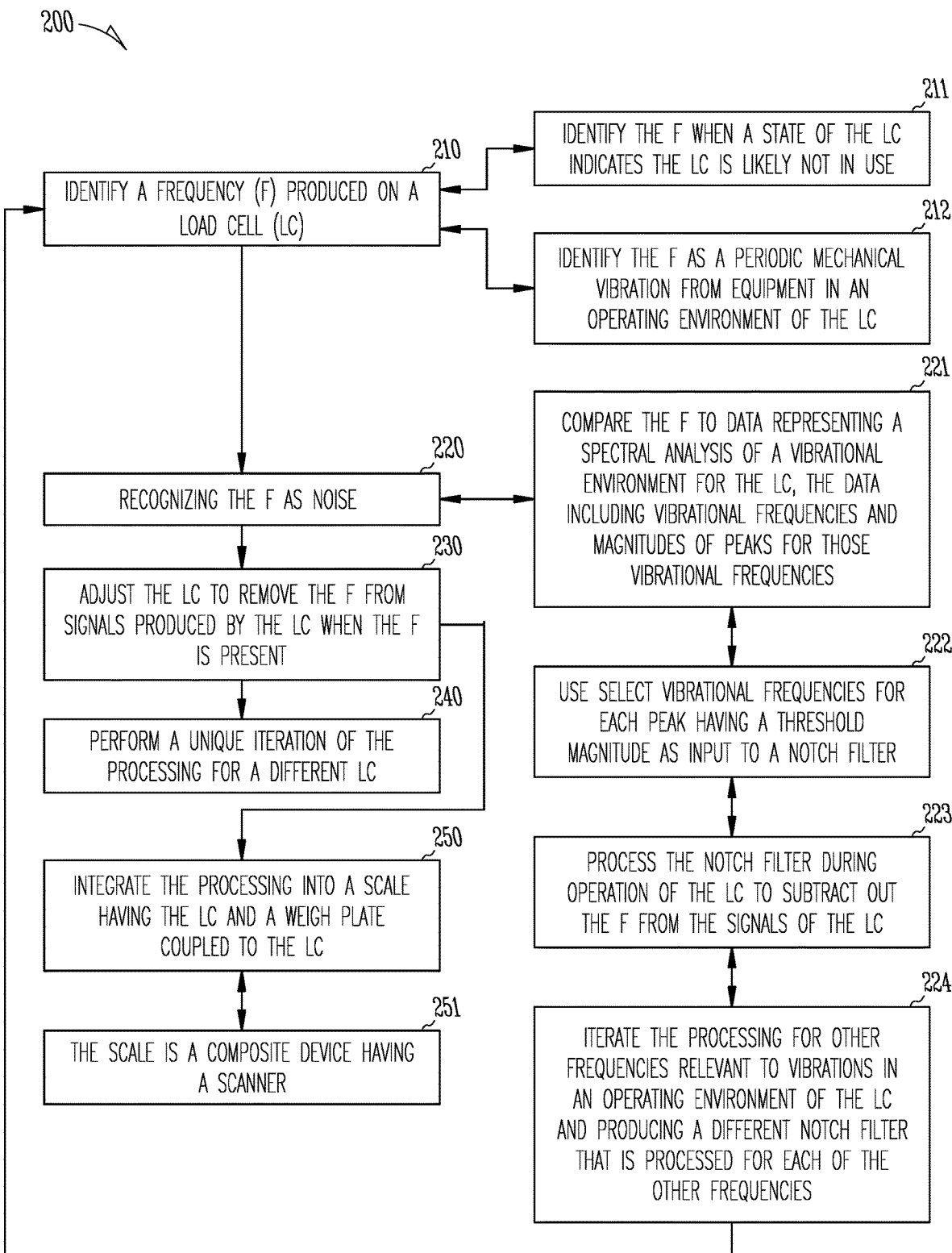
FIG. 2 is a diagram of a method for self-environmental adaptation by a POS device, according to an example embodiment.

FIG. 2 is a diagram of a method 200 for self-environmental adaptation by a POS device, according to an example embodiment. The software module(s) that implements the method 200 is referred to as a "self-scale adjuster." The self-scale adjuster is implemented as executable instructions programmed and residing within memory and/or a non-transitory computer-readable (processor-readable) storage medium and executed by one or more processors of a scale device. The processor(s) of the scale device that executes the self-scale adjuster are specifically configured and programmed to process the self-scale adjuster. The self-scale adjuster may, but does not have to have, access to a network during its processing. The network can be wired, wireless, or a combination of wired and wireless.

In an embodiment, the scale device that executes the self-scale adjuster is the integrated scanner/scale 120 of the FIG. 1.

In an embodiment, the scale device that executes the self-scale adjuster is a weigh scale without any other device directly integrated therein.

In an embodiment, the self-scale adjuster is the spectra analyzer 122 and one or more notch filters 123 interfaced or coupled to one or more load cells 121 of the FIG. 1.

At 210, the self-scale adjuster identifies a frequency produced on a load cell. When the load cell detects a change in force exerted from a weigh plate, this alters the signals produced within the load cell and produces a frequency. Sometimes the frequency is legitimate, for instance something is being weighed and a product is on the weigh plate. Other times the frequency is not legitimate, for instance vibrations from operational equipment is causing the weight plate to move slightly altering the force and producing the frequency.

According to an embodiment, at 211, the self-scale adjuster identifies the frequency when a state of the load cell is likely not in use. This was discussed above. This can be determined by inferring the load cell is not presently in use based on conditions known for when the load cell is in use (as also discussed above).

In an embodiment, at 212, the self-scale adjuster identifies the frequency as a periodic mechanical vibration from equipment in an operating environment of the load cell.

At 220, the self-scale adjuster recognizes the frequency as noise. That is, the frequency is not legitimate and should not be present because its presents will alter the accuracy of the device associated with the load cell (weight measurement for a scale).

For example, at 221, the self-scale adjuster compares the frequency to data representing a spectral analysis of a vibration environment for the load cell. The data includes vibrational frequencies and magnitudes of peaks for those vibrational frequencies.

In an embodiment of 221 and at 222, the self-scale adjuster uses select vibrational frequencies for each peak having a threshold magnitude as input to a notch filter.

In an embodiment of 222 and at 223, the self-scale adjuster processes the notch filter during operation of the load cell to subtract out the frequency from the signatures of the load cell. This is a dynamic and adaptive process because when the frequency is detected during operation (dynamic), the frequency is removed (adaptive).

In an embodiment of 223 and at 224, the self-scale adjuster iterates the process at 210 for other frequencies relevant to vibrations in an operating environment of the load cell. Each iteration of 210 by the self-scale adjuster produces a different notch filter that is processed for each of the over vibrational frequencies.

At 230, the self-scale adjuster adjusts the load cell to remove the frequency from signals produced by the load cell when the frequency is present or appears in those signals. This makes the device that the load cell is integrated into more accurate by removing noise caused by the vibrations from other electric and mechanical devices operation in a same environment as the device with the load cell.

According to an embodiment, at 240, the self-scale adjuster performs a unique iteration of the processing at 210 for a different load cell. So, the self-scale adjuster can simultaneously monitor multiple load cells integrated within a same device.

In an embodiment, at 250, the self-scale adjuster is integrated into a scale having the load cell and a weigh plate coupled to and exerting force on the load cell.

In an embodiment of 250 and at 251, the scale is a composite device that also includes a scanner.

Figure 3:
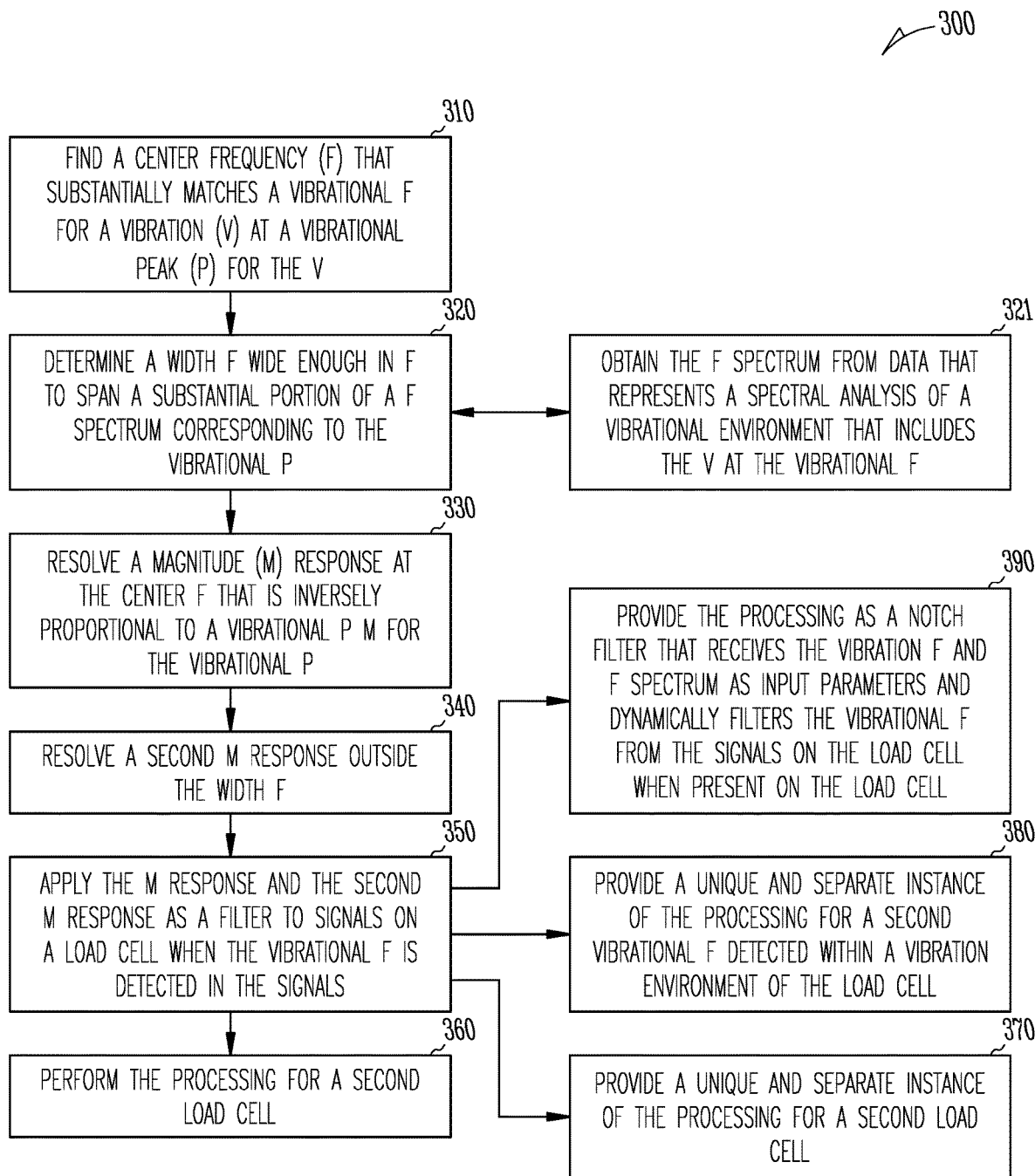
FIG. 3 is a diagram of another method for self-environmental adaptation by a POS device, according to an example embodiment.

FIG. 3 is a diagram of another method 300 for self-environmental adaptation by a POS device, according to an example embodiment. The software module(s) that implements the method 300 is referred to as a "mechanical vibration filter." The mechanical vibration filter is implemented as executable instructions programmed and residing within memory and/or a non-transitory computer-readable (processor-readable) storage medium and executed by one or more processors of weigh scale. The processors that execute the mechanical vibration filter are specifically configured and programmed to process the mechanical vibration filter. The mechanical vibration filter may or may not have access to one or more networks during its processing. Each network can be wired, wireless, or a combination of wired and wireless.

In an embodiment, the weigh scale is the integrated scanner/scale 120 of the FIG. 1.

In an embodiment, the mechanical vibration filter performs at least a portion of the processing associated with the self-scale adjuster of the FIG. 2.

In an embodiment, the mechanical vibration filter is the notch filter 123 interfaced or coupled to one or more load cells 121 of the FIG. 1.

At 310, the mechanical vibration filter finds a center frequency that substantially matches a vibrational frequency for a vibration at a vibrational peak for the vibration. A threshold range for a match can be used to determine the substantial match.

At 320, the mechanical vibration filter determines a width frequency that is wide enough in frequency to span a substantial portion of a frequency spectrum that corresponds to the vibrational peak. Again, substantial can be determined by a threshold range.

According to an embodiment, at 321, the mechanical vibration filter obtains the frequency spectrum from data that represents a spectral analysis of a vibrational environment that includes the vibration at the vibrational frequency. The spectral analysis can be performed periodically when the load cell is determined to likely not be in use, so that the data is continually updated and relevant to a current vibrational environment of the device having the load cell.

At 330, the mechanical vibration filter resolves a magnitude response at the center frequency that is inversely proportional to a vibrational peak magnitude for the vibrational peak.

At 340, the mechanical vibration filter resolves a second magnitude response outside the width frequency. In an embodiment, this is 1.00000.

At 350, the mechanical vibration filter applies the magnitude response and the second magnitude response as a filter to signals on the load cell when the vibrational frequency is detected in the signals. This ensures that noise and frequencies that can affect the accuracy of the load cell are removed.

In an embodiment, at 360, the mechanical vibration filter is performed for a second load cell of the device having the load cell. So, a device with multiple load cells can benefit from the filtering of the mechanical vibration filter.

In an embodiment, at 370, a unique and separate instance of the mechanical vibration filter is provided for a second load cell. So, a device having multiple load cells can be filtered by different independent instances of the mechanical vibration filter.

In an embodiment, at 380, a unique and separate instance of the mechanical vibration filter is provided for the load cell for a second vibrational frequency detected within a vibrational environment of the load cell. So, each vibrational frequency can use its own configured instance of the mechanical vibration filter within the device of the load cell.

In an embodiment, at 390, the mechanical vibration filter is provided as a notch filter that receives the vibrational frequency and the frequency spectrum as input parameters and in response thereto, the mechanical vibration filter dynamically filters the vibrational frequency from the signals on the load cell when present on the load cell. So, the mechanical vibration filter can be dynamically configured for the vibrational frequency.

Figure 4:
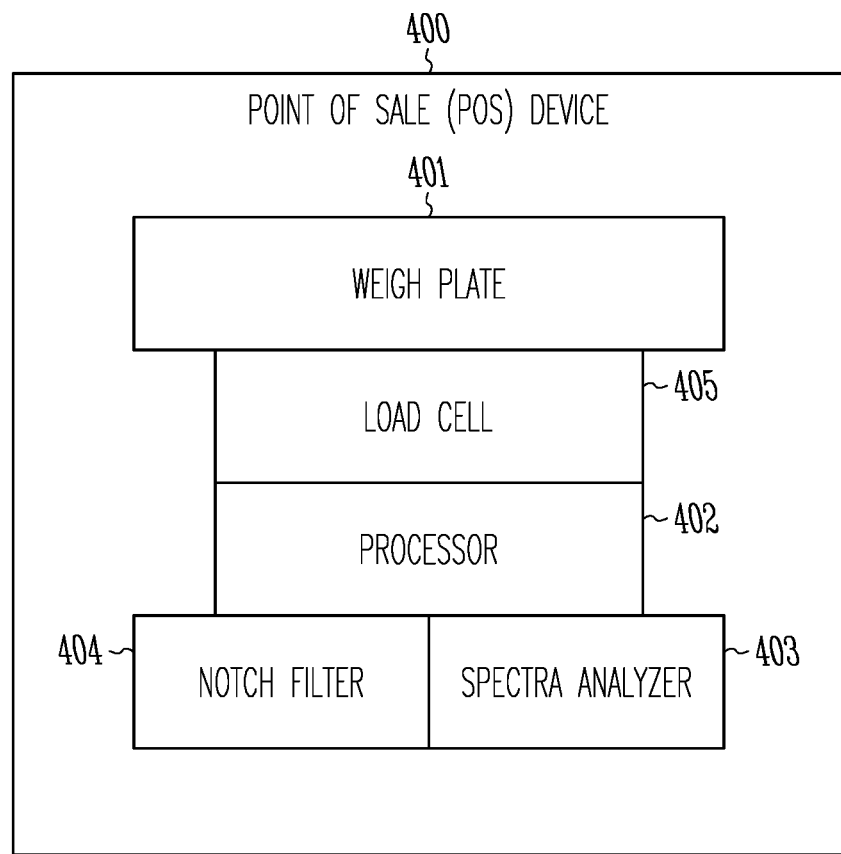
FIG. 4 is a diagram of an adaptive POS device, according to an example embodiment.

FIG. 4 is a diagram of an adaptive POS device 400, according to an example embodiment. Some components of the adaptive POS device 400 are programmed and reside within memory and/or a non-transitory computer-readable medium and execute on one or more processors of the adaptive POS device 400. The adaptive POS device 400 may or may not communicate over one or more networks, which can be wired, wireless, or a combination of wired and wireless.

In an embodiment, the adaptive POS device 400 is integrated scanner/scale 120 of the FIG. 1.

In an embodiment, the adaptive POS device 400 is a scale.

In an embodiment, the adaptive POS device 400 during operation performs the processing associated with the FIGS. 1-3.

The adaptive POS device 400 includes a weigh plate 401, a processor 402, a spectra analyzer 403, and one or more notch filters 404.

The weigh plate 401 is coupled to and exerts force against one or more load cells 405. This generates changes in signals (such as current) that pass through the load cells 405, the changes in the signals can be transformed into frequencies.

The processor 402 executes the spectra analyzer 403 and the one or more notch filters 404.

The spectra analyzer 403 is adapted and configured to: execute on the processor 402 and produce a frequency spectrum for a vibrational frequency. The vibrational frequency detected based on movement of the weigh plate 401 that changes force exerted on the load cells 405, which alters the signals that are transformed (transduced) into the vibration frequency (caused by other equipment operating in a same environment as the POS device 400).

The notch filter 404 (can be multiple notch filters 404 as well) is configured to execute on the processor 402 and remove the vibrational frequency from signals of the load cell 405 when the vibration frequency is present in the signals by using the frequency spectrum and the vibrational frequency. This was discussed at length above.

According to an embodiment, the POS device 400 is a scale.

In an embodiment, the POS device 400 is an integrated scanner and scale.

In an embodiment, the POS device 400 is integrated into a checkout station having electrical and mechanical equipment and the vibrational frequency associated with operation of the electrical and mechanical equipment.

One now appreciates how an improved POS device can self-adaptively, dynamically, and in real time filter out mechanical vibrations detected in its operation environment to improve its operational measurements.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. An Point-Of-Sale (POS) device, comprising:
   a processor;
   a weigh plate including a plurality of load cells;
   a spectra analyzer adapted and configured to: i) execute on the processor and ii) produce a frequency spectrum for a vibrational frequency for each of the plurality of load cells to find a center frequency produced on a load cell measuring a zero stable weight that substantially matches a vibrational frequency for a vibration at a vibrational peak for the vibration when a state of the load cell indicates the load cell is not in use; and
   a notch filter adapted and configured with regard to each of the plurality of load cells to i) execute on the processor and ii) remove the vibrational frequency from signals of the respective load cell when the vibration frequency is present in the signals by using the frequency spectrum and the vibrational frequency.

2. The POS device of claim 1, wherein POS device is a scale.

3. The POS device of claim 1, wherein the POS device is an integrated scanner and scale.

4. The POS device of claim 1, wherein the POS device is integrated into a checkout station having electrical and mechanical equipment and the vibrational frequency associated with operation of the electrical and mechanical equipment.

* * * * *